(12) United States Patent
Barton

(10) Patent No.: US 11,047,507 B2
(45) Date of Patent: Jun. 29, 2021

(54) OPERATOR FEEDBACK OF VALVES

(71) Applicant: CHARGEPOINT TECHNOLOGY LIMITED, Liverpool (GB)

(72) Inventor: Richard Athol Barton, Salford (GB)

(73) Assignee: Chargepoint Technology Limited, Liverpool (GB)

( * ) Notice: Subject to any disclaimer, the term of this patent is extended or adjusted under 35 U.S.C. 154(b) by 99 days.

(21) Appl. No.: 15/501,017

(22) PCT Filed: Jul. 30, 2015

(86) PCT No.: PCT/GB2015/052203
§ 371 (c)(1),
(2) Date: Feb. 1, 2017

(87) PCT Pub. No.: WO2016/016650
PCT Pub. Date: Feb. 4, 2016

(65) Prior Publication Data
US 2017/0219119 A1  Aug. 3, 2017

(30) Foreign Application Priority Data

Aug. 1, 2014  (GB) ...................................... 1413711

(51) Int. Cl.
*F16K 37/00* (2006.01)
*F16K 31/60* (2006.01)
(52) U.S. Cl.
CPC ........ *F16K 37/0083* (2013.01); *F16K 31/602* (2013.01); *F16K 37/0041* (2013.01); *F16K 37/0058* (2013.01); *Y10T 137/8242* (2015.04)

(58) Field of Classification Search
CPC ............... F16K 31/602; F16K 31/0083; F16K 37/0083; F16K 37/0041; F16K 37/0058; Y10T 137/8242
(Continued)

(56) References Cited

U.S. PATENT DOCUMENTS 3,171,431 A  *  3/1965  Hansen ................. F16K 5/0689
                                                            137/454.6
3,223,111 A  *  12/1965  Anderson ............. F16K 5/0689
                                                            137/454.6
(Continued)

FOREIGN PATENT DOCUMENTS

CN         203009892 U  *  6/2013  ............... F16K 5/06
DE        102008064406 A1    5/2010
(Continued)

OTHER PUBLICATIONS

PCT International Search Report dated Feb. 16, 2017; filed in International Application No. PCT/GB2015/052203; 7 pgs.

*Primary Examiner* — William M McCalister
(74) *Attorney, Agent, or Firm* — Vedder Price P.C.

(57) ABSTRACT

An apparatus provides operator feedback in response to opening or closing of a valve or coupling, The apparatus may comprise: data storage means for storing at least one recommended opening or dosing event of the valve; sensing means for sensing operator actuation of the valve or coupling; and processing means for comparing the sensed actuation of the valve or coupling against the recommended opening or dosing event of the valve or coupling in real-time or near real-time, and outputting at least one operator feedback signal based on the comparison.

21 Claims, 5 Drawing Sheets

(58) Field of Classification Search
USPC .......................................................... 137/554
See application file for complete search history.

(56) References Cited

U.S. PATENT DOCUMENTS

| | | | | |
|---|---|---|---|---|
| 3,239,190 A * | 3/1966 | Mayo | ...................... | F16K 5/184 |
| | | | | 251/175 |
| 3,355,141 A * | 11/1967 | Cooper | .................. | F16K 35/00 |
| | | | | 251/101 |
| 3,682,439 A * | 8/1972 | Neto | ..................... | F16K 5/0689 |
| | | | | 251/315.05 |
| 4,523,286 A * | 6/1985 | Koga | ....................... | F01D 17/02 |
| | | | | 137/551 |
| 5,086,273 A * | 2/1992 | Leon | ........................ | G01B 7/14 |
| | | | | 116/277 |
| 5,140,263 A * | 8/1992 | Leon | ........................ | G01B 7/14 |
| | | | | 116/277 |
| 5,265,845 A * | 11/1993 | Gilliam | .................. | F16K 5/204 |
| | | | | 251/163 |
| 5,329,465 A * | 7/1994 | Amelia | ................... | G07C 3/00 |
| | | | | 137/554 |
| 5,349,979 A * | 9/1994 | Zeien | ..................... | B25B 5/068 |
| | | | | 137/318 |
| 5,433,245 A * | 7/1995 | Prather | ............... | F16K 37/0083 |
| | | | | 137/554 |
| 5,477,149 A * | 12/1995 | Spencer | ................. | G01R 31/06 |
| | | | | 137/554 |
| 5,622,201 A * | 4/1997 | Chang | ....................... | F16K 1/12 |
| | | | | 137/219 |
| 5,738,071 A * | 4/1998 | Smith, Jr. | ............... | F02D 41/20 |
| | | | | 123/357 |
| 6,131,609 A * | 10/2000 | Metso | ................. | F16K 37/0091 |
| | | | | 137/552 |
| 6,263,915 B1 * | 7/2001 | Hayashi | .............. | F15B 13/0402 |
| | | | | 137/554 |
| 6,612,333 B2 * | 9/2003 | Miyazoe | ........... | F15B 13/0402 |
| | | | | 137/554 |
| 6,895,997 B2 * | 5/2005 | Qu | ......................... | G05B 19/19 |
| | | | | 137/554 |
| 7,117,886 B2 * | 10/2006 | Kajitani | ............... | G05D 16/202 |
| | | | | 137/487.5 |
| 7,401,624 B2 * | 7/2008 | Heer | .................... | F16K 37/0091 |
| | | | | 137/1 |
| 8,307,845 B2 * | 11/2012 | Kouchi | .................... | G01F 1/363 |
| | | | | 137/486 |
| 8,521,334 B2 * | 8/2013 | Meier | ...................... | F15B 15/20 |
| | | | | 137/554 |
| 8,560,096 B1 * | 10/2013 | Chapman | ................. | G01F 1/00 |
| | | | | 700/83 |
| 2005/0199299 A1 * | 9/2005 | Schick | ................... | F16K 11/074 |
| | | | | 137/625.46 |
| 2006/0032536 A1 * | 2/2006 | Galloway | ........... | F16K 37/0083 |
| | | | | 137/554 |
| 2006/0150932 A1 * | 7/2006 | Naber | ........................ | F01L 9/04 |
| | | | | 123/90.11 |
| 2012/0031499 A1 * | 2/2012 | Scott | ...................... | F16K 31/046 |
| | | | | 137/14 |
| 2012/0204998 A1 * | 8/2012 | Brimson | ................... | B65B 1/28 |
| | | | | 141/1 |
| 2013/0160863 A1 * | 6/2013 | Yates | ...................... | F16K 1/222 |
| | | | | 137/15.01 |
| 2016/0041539 A1 * | 2/2016 | Kemp | .................... | G05B 15/02 |
| | | | | 700/80 |

FOREIGN PATENT DOCUMENTS

| | | | | |
|---|---|---|---|---|
| WO | WO-0240914 A2 * | 5/2002 | ............ | F17C 13/084 |
| WO | WO 0240914 A2 | 5/2002 | | |

* cited by examiner

OPERATOR FEEDBACK OF VALVES

This invention relates to a system and method for providing operator feedback. In particular, this invention relates to a system and method for providing operator feedback for manual operation of valves, in particular, but not exclusively, to valves for controlling, charging, discharging and/or regulating the flow of powders, liquids, slurries, tablets and/or fluids.

Valves, such as split butterfly valves, are available in many designs and used widely for processes where product containment is required to prevent product exposure to the environment and to personnel working in close proximity to the product. Split butterfly valve designs allow the valve to be split open into two units, commonly known as active and passive units. The valve design is such that when split, the two halves keep the contents on either side sealed and contained.

In the manufacture of pharmaceuticals, chemicals, biological material and food, effective containment is essential for the safe and hygienic handling of such compounds and materials. At each stage of the manufacturing process, handling must be controlled and managed to provide optimum protection for the operator and for maintaining the integrity of the product.

The material being handled is often hazardous to health, owing to the increasing potency of many new pharmaceutical ingredients. Pharmaceutical and bio-manufacturing products are often manufactured under strict controls against product contamination. This is because the products are often for human consumption and the industries are heavily regulated by bodies like the FDA (Food and Drug Administration) in the United States and the MHRA (Medicines and Healthcare products Regulatory Agency) in the United Kingdom. Furthermore, the pharmaceutical products, such as active pharmaceutical ingredients and/or subsequently diluted powders, may in sufficient quantities be hazardous to the health of an operator. It is therefore necessary to avoid direct contact between an operator and the potentially hazardous material. Owing to such stringent requirements for there to be a good seal between the active and passive units of the split valve to prevent product exposure to the environment and to personnel working in close proximity of the product, manufacture of the elements of the valve are under stringent conditions to ensure that the dimensions of the elements are precisely manufactured to ensure stringent tolerances are met.

It is important when operating the valve to ensure that the valve is opened and closed in a recommended or predetermined manner as prescribed by the operator manual accompanying the valve. However, poor communication and training, sometimes coupled with a lack of operator attentiveness, can often mean that the valve is operated in an incorrect manner, which significantly increases the risk of critical failure, misuse or unplanned maintenance.

It is an object of the present invention to overcome or alleviate one or more of the problems associated with the operation of valves in the prior art.

According to the present invention there is provided an apparatus for providing operator feedback in response to opening or closing of a valve or coupling.

Preferably, the apparatus further comprises:
data storage means for storing at least one recommended opening or closing event of the valve;
sensing means for sensing operator actuation of the valve or coupling; and
processing means for comparing the sensed actuation of the valve or coupling against the recommended opening or closing event of the valve or coupling in real-time or near real-time, and outputting at least one operator feedback signal based on the comparison.

Further preferably, the valve or coupling is a powder transfer valve.

In use, the valve or coupling may be selected from the group consisting of split butterfly valve, split sliding gate valve, split ball valve, twin valve, rapid transfer port and alpha beta port.

Preferably, operator actuation of the valve or coupling is selected from the group consisting of manually-operable actuation, pneumatic actuation and electrical actuation.

Further preferably, the sensing means for sensing operator actuation of the valve or coupling is selected from the group consisting of multi-axis accelerometer, rotational encoder and on/off sensor.

In use, the sensing means for sensing operator actuation of the valve or coupling may sense the rotational position of a valve closure member relative to a valve housing.

Preferably, the sensing means for sensing operator actuation of the valve or coupling is positioned on an actuator.

Preferably, the actuator comprises an elongate handle having an elongate shaft; one end of the shaft being dimensioned to form a knob; the other end of the shaft being dimensioned to form a central hub.

Further preferably, the central hub comprises a first face for connection to the valve or coupling and an opposite second face that is visible to the operator.

In use, the first face of the central hub may comprise a socket dimensioned to connect with a square spigot on the valve or coupling.

Preferably, the central hub defines a generally circular body into which a printed circuit board, battery and liquid crystal display which is visible through the second face is contained.

Further preferably, the central hub defines a sealed, ingress protected enclosure.

In use, the data storage means, sensing means and processing means may be located on the printed circuit board.

Preferably, the data storage means and processing means are implemented in a low power microcontroller.

Further preferably, the processing means receives a wake-up signal from user input buttons and/or from the sensing means for sensing operator actuation of the valve or coupling and/or from one or more sensors embedded on or remote to the printed circuit board.

In use, the processing means may receive a wake-up signal from input stimuli including rotation, pulse, shock, impact and/or vibration detected by the sensing means for sensing operator actuation of the valve or coupling.

Preferably, at least one operator feedback signal is selected from the group consisting of audio-visual, alpha-numeric and haptic feedback.

Further preferably, at least one operator feedback signal is an alarm signal.

In use, at least one operator feedback signal may be displayed on a colour display means.

Preferably, at least one operator feedback signal displays the angle the valve closure member makes relative to a valve housing or a percentage representative of the position of the valve closure member between fully-open and fully-closed.

Further preferably, at least one recommended opening or closing event of the valve defines opening or closing the valve closure member over a predetermined timescale, and/or or closing the valve closure member to a predetermined first position then opening the valve closure member to at least a second position before fully-closing the valve closure member, and/or opening the valve closure member to a predetermined first position then closing the valve closure member to at least a second position before fully-opening the valve closure member.

In use, at least one recommended opening or closing event of the valve may define moving the valve closure member to a predetermined maintenance, cleaning or sterilisation position or sequence.

Preferably, at least one recommended closing event of the valve defines an over-rotation of the valve closure member beyond 90° with respect to the plane of the valve housing.

Further preferably, the at least one recommended opening or closing event of the valve, the sensed operator actuation of the valve or coupling and/or at least one operator feedback signal is recorded displayed for local or remote access.

In use, the at least one recommended opening or closing event of the valve, the sensed operator actuation of the valve or coupling and/or at least one operator feedback signal may be transmitted back to a remote server using a wired or wireless communications unit.

Preferably, the processing means includes a GPS location module which records the location of the valve or coupling.

Further preferably, the processing means includes a unique product identifier.

Also according to the present invention there is provided a method of providing opening or closing feedback in a valve or coupling, comprising:

storing at least one recommended opening or closing event of the valve;

sensing operator actuation of the valve or coupling;

comparing the sensed actuation of the valve or coupling against the recommended opening or closing event of the valve or coupling in real-time or near real-time; and outputting at least one operator feedback signal based on the comparison.

Further according to the present invention there is provided a computer program product for providing opening or closing feedback in a valve or coupling, comprising:

computer program product means for storing at least one recommended opening or closing event of the valve;

computer program product means for sensing operator actuation of the valve or coupling;

computer program product means for comparing the sensed actuation of the valve or coupling against the recommended opening or closing event of the valve or coupling in real-time or near real-time; and computer program product means for outputting at least one operator feedback signal based on the comparison.

It is believed that a system and method for providing opening and/or closing feedback to an operator of a valve or coupling in accordance with the present invention at least addresses the problems outlined above. The advantages of the present invention are that a system and method is provided which ensures that a manual valve or coupling is operated in a safe and efficient manner, and which allows for the transfer of a product from one container or process vessel to another whilst minimising the levels of dust emission to the operating environment. Providing opening and/or closing feedback to the operator advantageously reduces the occurrences of critical valve failure, and may reduce excessive wear on viscoelastic valve components and seats, and thus reducing both planned downtime and unforeseen failure of valve components.

It will be obvious to those skilled in the art that variations of the present invention are possible and it is intended that the present invention may be used other than as specifically described herein.

Specific non-limiting embodiments of the invention will now be described by way of example only and with reference to the accompanying drawings, in which.

Figure 1:
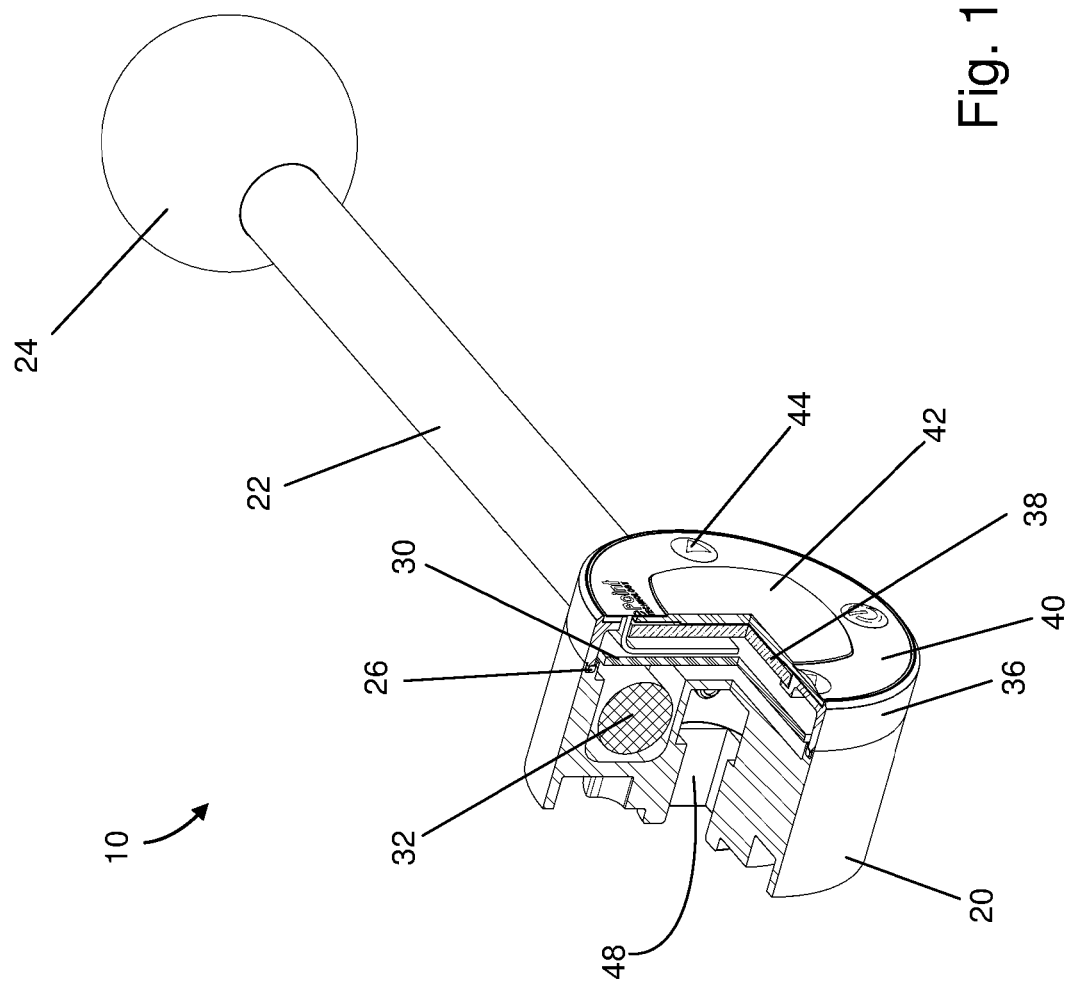
FIG. 1 is a cut-away side perspective view of the present invention embodied in a valve-actuating handle for manual operation of a valve in accordance with the present invention.
Figure 2:
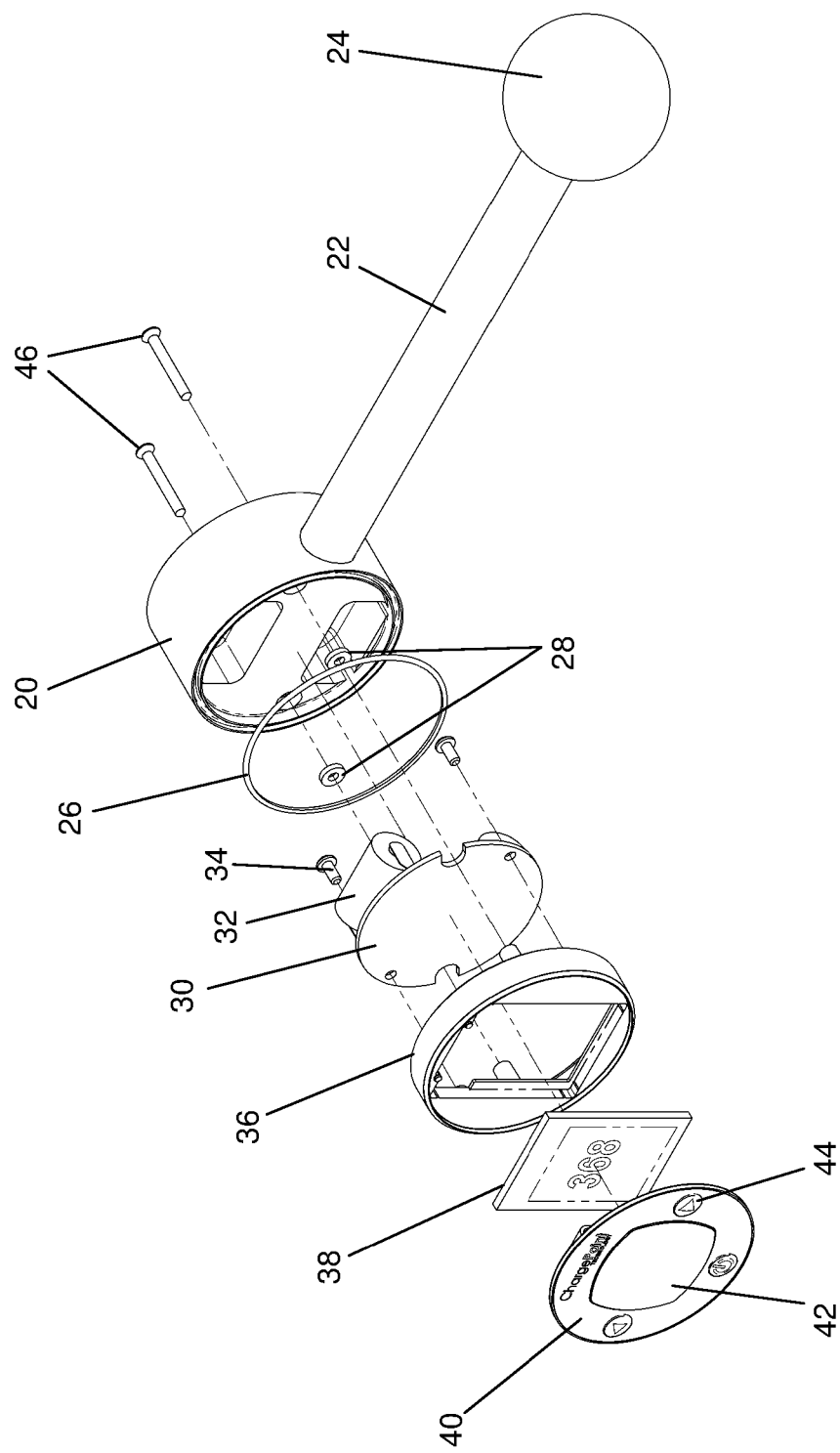
FIG. 2 illustrates an exploded view of the valve-actuating handle shown in FIG. 1.

Referring now to the drawings, a system for providing opening and/or closing feedback to an operator of a valve or coupling is illustrated in FIGS. 1 and 2. FIGS. 1 and 2 show how the present invention can be embodied in a valve-actuating handle 10 for manual operation of split valve assemblies.

Figure 3:
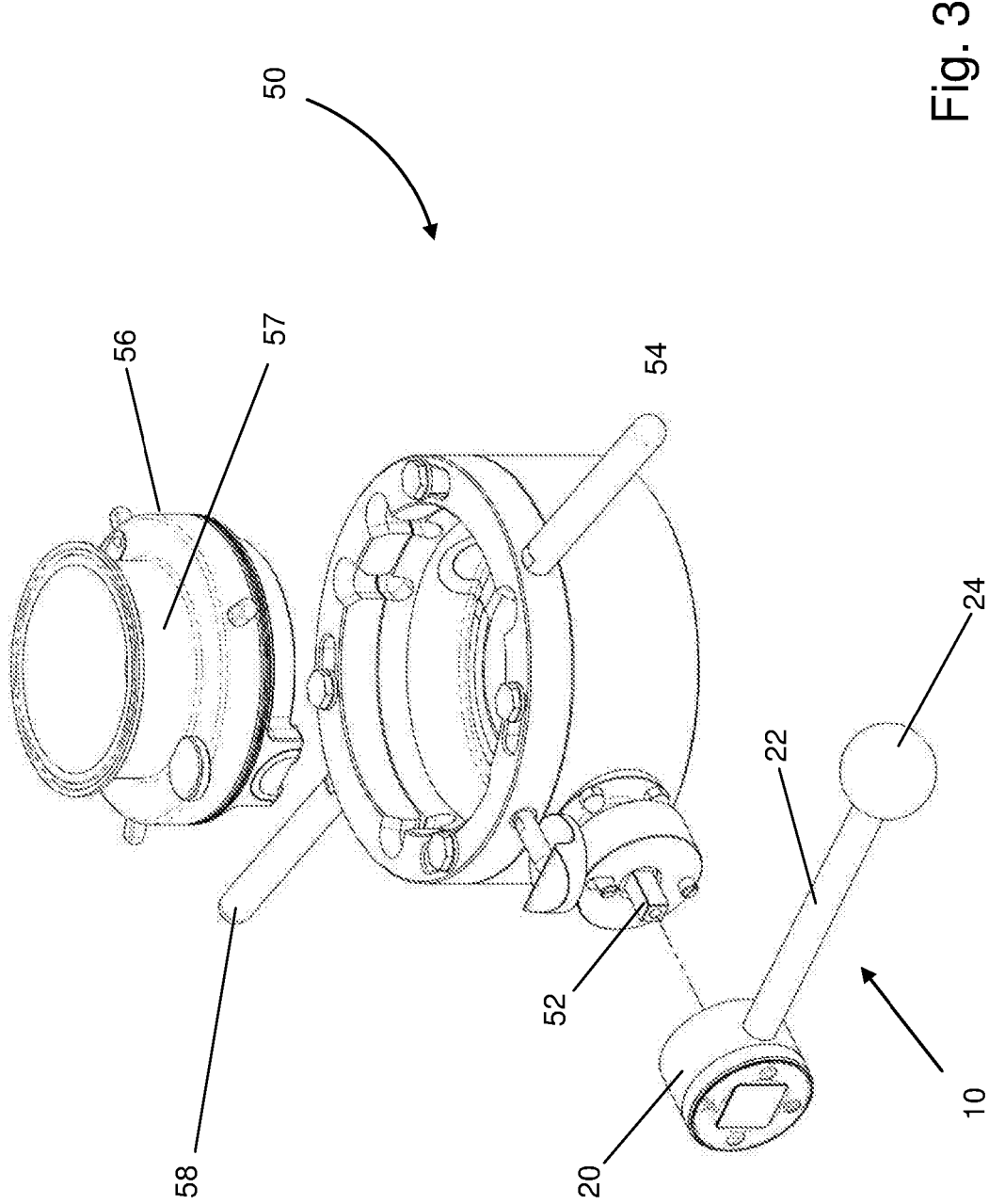
FIGS. 3 and 4 show how the valve-actuating handle of FIGS. 1 and 2 can be connected to a valve or coupling for manual operation.

As shown in FIG. 1, the valve-actuating handle 10 is formed having a solid handle shaft or arm 22; one end of which forms a knob 24. The other end of the handle shaft or arm 22 is secured to a hub 20 which is formed as a unitary, machined part. As best illustrated in FIG. 1, the rear face of the hub 20, i.e. the face that is placed in contact with the split valve assembly 50, defines a socket 48 which is dimensioned to connect with a square spigot 52 on the split valve assembly 50, as best illustrated in FIG. 3. The front face of the hub 20, i.e. the face that is visible to the operator, is generally circular in shape.

As best shown in FIG. 2, the hub 20 includes a generally annular housing 36 into which a printed circuit board (PCB) 30 and power source or battery 32 is secured via fixing screws 34. A colour liquid crystal display (LCD) 38 is positioned inside the aperture in the housing 36, opposite the PCB 30. The colour LCD display 38 is then secured in a screen sub-assembly 40 which includes a protective, transparent screen or window 42 at its centre and operation or function buttons 44 positioned around the radius of the screen sub-assembly 40 for ease of access. The buttons 44 include a power on/off button, standby and/or one or more function buttons.

As the valve-actuating handle 10 is intended to be used in environmentally-challenging conditions, including containing, regulating and controlling hazardous powders, dust, granular and semi-solid ingredients, the housing 36 and screen sub-assembly 40 are secured together using assembly screws 46 and internal O-ring seals 28 which secure the housing 36 and screen sub-assembly 40 to the hub 20 against a circumferential seal 26.

Figure 5:
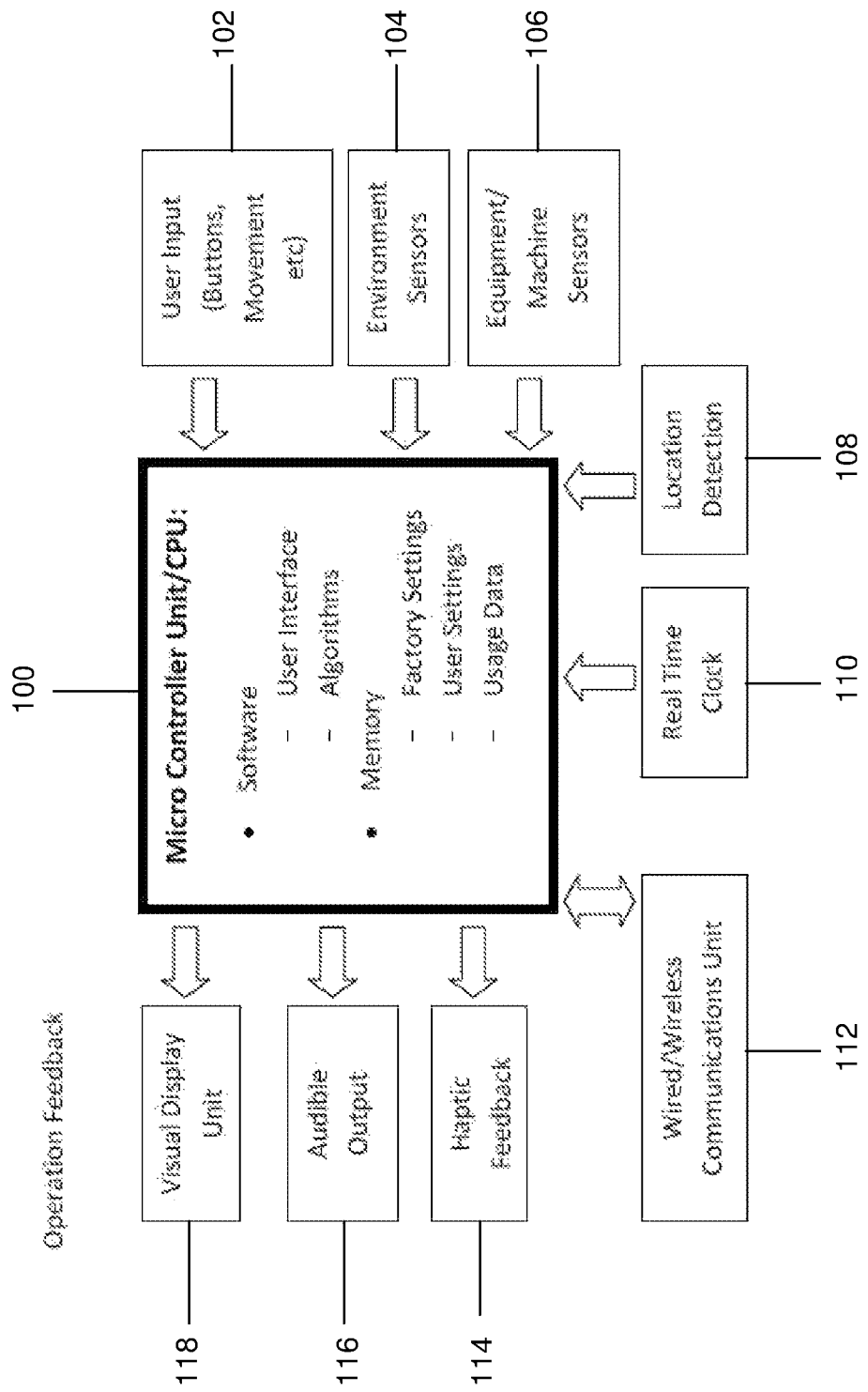
FIG. 5 is a high-level schematic diagram showing how the present invention is implemented in a microcontroller.

To provide opening and/or closing feedback to the operator of the split valve assembly 50, the PCB 30 includes various hardware, software, sensors and components, as best illustrated schematically and described in detail in relation to FIG. 5.

Figure 4:
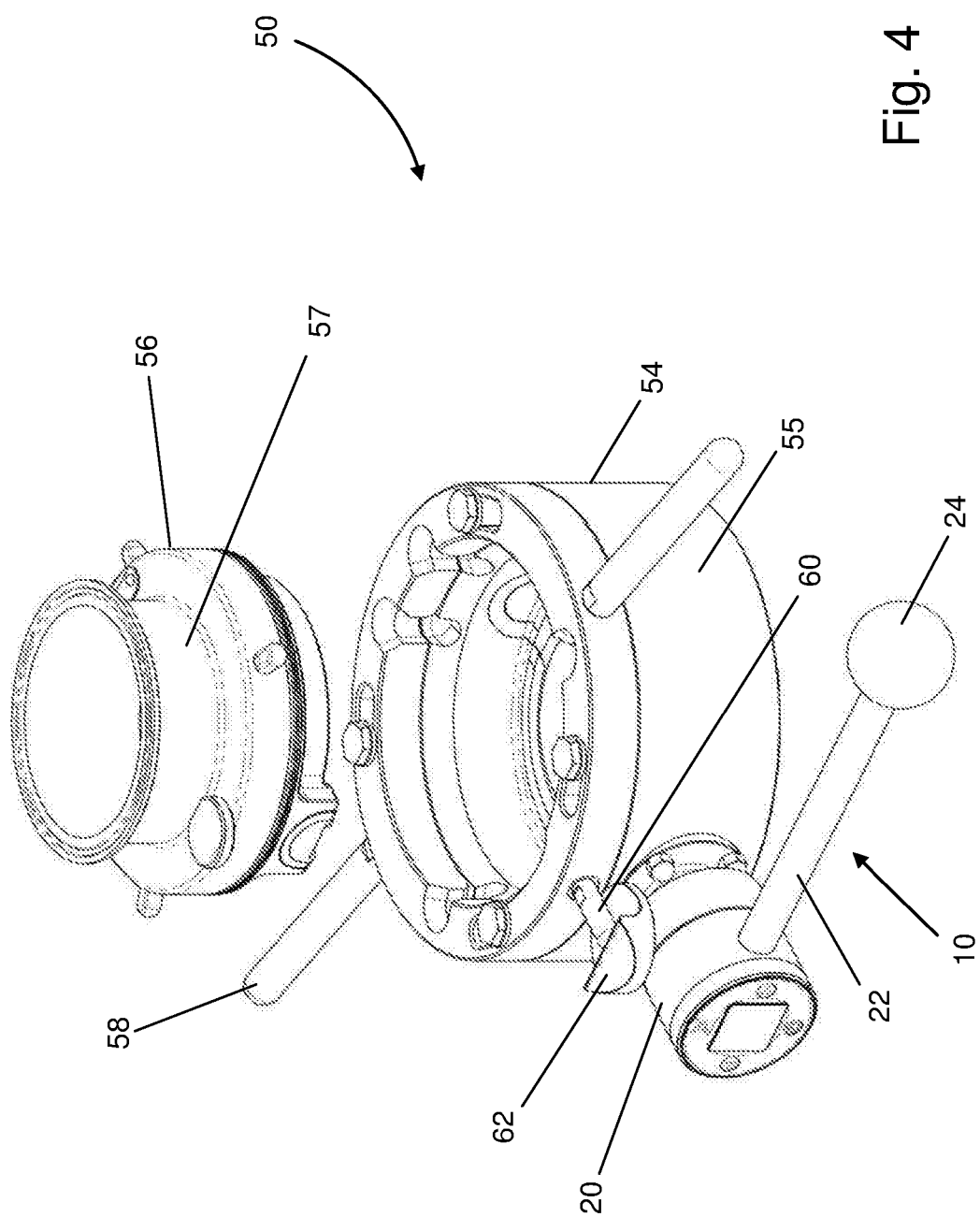

FIGS. 1 and 2 show how the present invention can be embodied in a valve-actuating handle 10 for manual operation of a valve or coupling, and particularly a split valve assembly 50 for containing, regulating and controlling hazardous powders, dust, granular and semi-solid ingredients. In use, the rear face of the hub 20, i.e. the face that is placed in contact with the split valve assembly 50, includes a socket 48 which is dimensioned to connect with the square spigot 52 on the split valve assembly 50, as shown in FIGS. 3 and 4. Operator rotation of the valve-actuating handle 10 controls respective pivotally-mounted valve closure members (not shown) inside the split valve assembly 50.

In an alternative embodiment, the hub 20 would be secured to the split valve assembly 50, with the valve-actuating handle 10 being rotatable within the body of the hub 20 to rotate socket 48. In this manner, the LCD display 38, and the operation and/or function buttons 44 positioned around the radius of the screen sub-assembly 40, are positioned in a fixed orientation for the user.

As shown in FIGS. 3 and 4, the split valve assembly 50 comprises two valve portions, an upper, passive valve portion 56 and a lower, active valve portion 54. The passive valve portion 56 defines a valve housing 57 which is generally annular in shape. The active valve portion 54 defines a valve housing 55 which is also generally annular in shape. The two valve portions 54, 56 are complementarily shaped such that one can sealingly engage and co-operate with the other to allow the movement of material therethrough. Although not shown in FIGS. 3 and 4, each valve portion includes valve closure members which are pivotally-mounted within the housings 55, 57. Each valve closure member is in the form of an annular disc, and each is provided with spindles by means of which each valve closure member is pivotally rotatable.

Although not shown in FIGS. 3 and 4, the spindle of the lower, active valve portion 54 is connected to, or is integrally formed with, spigot 52. Thus, rotation of the spindle is moved by rotation of the spigot 52. The spindle of the upper, passive valve portion 56 is connected to spigot 52. A mechanical safety interlock ensures the safe operation of the split valve assembly 50. When the two valve portions are correctly docked, the mechanical interlock pin 60 on the active valve portion 54 releases the profiled release pin 62 on the active valve portion 54 which allows the valve disc to be opened by rotation of the spigot 52.

The valve closure members are seated on annular valve seats (not shown) defined inside the valve housings 55, 57. The valve seats are resiliently deformable and are generally located in respective recesses for receipt of the seat which, in use, is adapted to engage against a solid portion of the valve housings 55, 57.

The valve closure members are adapted to be pivotable through 90° or beyond, thus when in its fully open position the profile of the face of the valve closure members corresponds with the profile of the through bore of the valve housings 55, 57, and thereby provides minimal restrictions for the flow of fluid or other material.

FIGS. 3 and 4 also show that the two valve portions 54, 56 of the split valve assembly 50 are able to be locked and unlocked via rotation of a handle 58. This can only occur when the split valve assembly 50 is in a closed configuration.

The two valve portions 54, 56 of the split valve assembly 50 are mountable on a vessel (not shown) for containing material, conveyance means, such as a hose, for conveying material and/or other process equipment known to the art. The means for mounting the valve portions may comprise any means known to the art, such as for example a screw thread, interference fit, bayonet attachment etc. Alternatively, the valve portions 54, 56 may be integrally formed with a vessel or conveyance means.

Whilst the foregoing describes how the present invention can be embodied in a valve-actuating handle 10 for manual operation of a valve or coupling, and particularly a split butterfly valve assembly 50, the skilled person will appreciate that the invention can be implemented in any manner of transfer valve or coupling, such as, for example, split sliding gate valves, split ball valves, twin valves, rapid transfer ports and alpha beta ports.

FIG. 5 is a schematic diagram showing how the system and method for providing opening and/or closing feedback to an operator of a valve or coupling is implemented in a small, self-powered unit that includes a low power microcontroller 100. As shown in FIG. 5, the microcontroller 100 receives a number of inputs generally indicated in the right hand side of this figure.

The microcontroller 100 can be considered a self-contained system with a processor, memory and peripherals and can be used to provide opening and/or closing feedback to the operator via a number of outputs generally indicated in the left hand side of this figure.

FIG. 5 is a schematic diagram and, in order to aid clarification, many other circuit elements are not shown. For example, although not shown in FIG. 5, the analogue signal received from one or more environmental sensors 104 embedded on the printer circuit board 30 is first converted to a digital form by any suitable type of analogue-to-digital convertor (ADC) available in the art. Equally, one or more of the digital outputs of the microprocessor 100 can be converted to analogue form using any form of digital-to-analogue convertor (DAC) available in the art. For example, such an analogue output signal could be used to energise an audible output 116.

In operation, a set of instructions or algorithm written in software in the microcontroller 100 are configured to program the microcontroller 100. The microcontroller 100, including the processor, memory and peripherals, are firstly placed in a low power, standby mode, awaiting a wake-up signal. The wake-up signal can be received from the user input buttons 102 and/or from one or more environmental sensors 104 embedded on the printer circuit board 30 and/or from one or more equipment sensors 106. In its most basic mode of operation, the microcontroller 100 can be effectively woken-up from standby mode by the operator pressing the on/off or standby button 102 located on the screen sub-assembly 40.

In addition or alternatively, the microcontroller 100 could effectively be woken-up from low power standby mode by the operator simply grasping the handle shaft 22 or knob 24. In a preferred embodiment, one of the equipment sensors 106 located on the printed circuit board 30 is a positional sensor which senses the rotational position of the handle 22 relative to the split valve assembly 50. In use, the positional sensor is a three-axis accelerometer, and which is receptive to small input stimuli including rotation, pulse, shock, impact and/or vibration to firstly awaken the microcontroller 100.

When the microcontroller 100 has been woken-up, it then senses the output of the three-axis accelerometer to determine the orientation and position of the rotation of the valve-actuating handle 10. Since the position of the valve-actuating handle 10 controls the position of the pivotally-mounted valve closure members inside the split valve assembly 50, the microcontroller 100 is able to determine the position of the pivotally-mounted valve closure members inside the split valve assembly 50 in real-time or near real-time.

In a basic mode of operation, the LCD display 38 can be used to display actions, movements or commands to the user, e.g. by displaying the words "OPEN" or "CLOSE". In addition, or alternatively, as opposed to displaying actions, movements or commands to the user, the state of the valve can be displayed. For example, the display 38 would indicate that the valve closure members are fully open by displaying the word "OPENED" or "0°" or simply displaying a green screen. Equally, if the microcontroller 100 determines that the pivotally-mounted valve closure members are fully-closed against their respective valve seats, the display 38 would indicate that word "CLOSED" or "90°" or simply display a red screen.

For detection of position of the valve closure members between fully-open and fully-closed, the angle between 0° and 90° or beyond is displayed, if the valve closure members are operated using an "over-rotation" method of cleaning the valve closure members and/or valve seats (as described in the applicant's published application WO 2012/007732 A1) is employed. Equally a percentage representative of the position of the valve closure members, between fully-open and fully-closed, can be displayed. For example, the display would indicate "100%" if the valve closure members are fully-open, and "0%" if fully-closed, and other percentages displayed for the sensed angles therebetween.

In a preferred embodiment of the invention, the position of the valve closure members relative to some predetermined or recommended opening or closing profile of the valve assembly is sensed, and at least one operator feedback signal is outputted based on the comparison.

The skilled person will appreciate that when operating the valve assembly 50 for controlling, charging, discharging and/or regulating the flow of liquids, slurries, tablets and/or hazardous fluids and potentially life-threatening pharmaceutical dusts and powders, it is imperative that a good seal is made between the valve closure member and the valve seat on each of the valve portions 54, 56. This is achieved, in practice, by operating the valve assembly according to a predetermined or recommended opening and/or closing profile, which is written in software in the microcontroller 100.

The predetermined or recommended opening and/or closing condition or event can involve, for example, fully closing or opening the valve closure member over a certain timescale, e.g. 10 seconds, or closing the valve closure member to a certain predetermined first angle then opening the valve closure member to a second angle before fully-closing the valve closure member. This operation has the effect of removing excess powder from the valve closure members. Equally, performing an over-rotation of the valve closure member beyond 90° with respect to the plane of the valve seat can help to ensure that a good seal is made. The over-rotation beyond 90° allows the valve closure member to scrape off any residual material, such as powder, that may be disposed at the sealing surface of the valve seat to ensure that when the valve closure member is subsequently in its closed configuration, perpendicular to the valve seat, there is a good seal therebetween. Further detail of performing an over-rotation of the valve closure member beyond 90° can be found in the applicant's earlier publication WO 2012/007732 A1.

Split valve assemblies 50 can be sterilised or decontaminated via a number of known methods, which include autoclaving, passing steam through the open valve, or passing other gases, such as vapourised hydrogen peroxide, through them prior to any pharmaceutical product coming into contact with the internal surfaces or product contact parts. Such Steam-In-Place (SIP) sterilisation often necessitates a predetermined or recommended opening and/or closing condition or event of the valve. The skilled person will appreciate that the operator could initiate an optimised or recommended opening or closing profile by firstly selecting an appropriate user input button 44, for example, by selecting a simple open, close or SIP. The microcontroller 100 then compares the sensed rotational position of the valve closure member in real-time or near real-time relative to the recommended opening or closing condition or event of the valve. The microcontroller 100 then outputs at least one operator feedback signal based on this comparison. The operator feedback signal can include one or any combination of, output signals to the visual display unit 118, an audible output or alarm 116 or some form of haptic feedback 114.

In one embodiment, as the user closes or opens the valve, a simple traffic light mode is employed whereby if the valve-actuating handle 10 is rotated at or near the recommended opening or closing condition or event of the valve, then the at least one operator feedback signal might be to illuminate the display 38 as green. If the operator closes the valve either too fast or too slowly, the display 38 will shift to orange or red indicating to the operator that valve is being operated incorrectly or carelessly.

In combination with these visual colour signals, various terms could be displayed to the operator, such as, "SLOW DOWN", "SPEED UP", "CORRECT" etc. An audible output 116 or alarm signal can also be used where the pitch or volume changes to indicate the comparison between the sensed rotational position of the valve closure member relative to the recommended opening or closing condition or event of the valve. Haptic feedback 114, e.g. vibration transmitted through the handle 22, can also be used to indicate to the operator that the valve-actuating handle 10 is being rotated at or near the recommended opening or closing condition or event of the valve.

As well as the microcontroller 100 outputting at least one operator feedback signal based on the comparison between the sensed rotational position of the valve closure member relative to the recommended opening or closing condition or event of the valve, it is envisaged that this information can be stored in local memory for analysis. This feedback information can be accessed locally and/or transmitted back to a central server (not shown) using a communications unit 112 which may be a suitable wired or wireless communication protocol, including for example, Bluetooth, ZigBee, or over a cellular network.

It is also envisaged that the microcontroller 100 could also include or has embedded therein a GPS location module 108 which records the actual location of the valve assembly 50, along with other environmental sensors which record conditions such as external/internal temperature, light intensity, humidity, atmospheric pressure, force measurement and operation time 110. These parameters can be stored in local memory and transmitted back to a central server (not shown) using the communications unit 112.

It is desirable that the wireless network has low power consumption, enabling several years of operation between battery changes.

As an alternative to the wireless network described hereinbefore, transmission of the data may occur over a WiFi network.

Also by measuring the environmental condition of the valve assembly 50, for example, if it was subject to excessive vibration or impact, pressure from the process, solvents, excessive forces from surrounding equipment etc., then such information can also be used, with the operator feedback to predict and prevent critical failure or unplanned maintenance.

The device is battery-powered and sealed to the environment (i.e. ingress protected) and safe for used in hazardous and/or potentially explosive environments (e.g. ATEX rated). The microcontroller 100 utilises low power components so that the system is designed to provide a long battery life.

Various alterations and modifications may be made to the present invention without departing from the scope of the invention. For example, although particular embodiments refer to implementing the present invention on a split valve assembly, this is in no way intended to be limiting as, in use, the present invention could be implemented in any machine or equipment where operator feedback is desired. The invention is not restricted to the details of the foregoing embodiments. For example, the manually-operable handle may be replaced with a different actuator, such as pneumatic, electrical or other, then their state could also be sensed to provide guidance for maintenance or service.

The invention claimed is:

1. An apparatus for monitoring and providing operator feedback in response to opening or closing of a valve, further comprising:
    data storage means for storing at least one recommended opening or closing event of the valve; the data storage means implemented in a low power microcontroller;
    sensing means positioned on an actuator and configured for sensing operator actuation of the valve,
    wherein the actuator comprises an elongate shaft with one end of the shaft being dimensioned to form a central hub having a first face and a second face opposite the first face, wherein the opposite second face is visible during and operation of the valve; and
    wherein the central hub comprises of an annular housing having an embedded printed circuit board;
    and wherein the first face of the central hub further comprises a socket dimensioned to connect with a square spigot on the valve and configured for connection to the valve; and
    wherein the sensing means is selected from the group consisting of multi-axis accelerometer or rotational encoder or an on/off sensor; and
    wherein the sensing means for sensing operator actuation of the valve senses the rotational position of a valve closure member relative to a valve housing; and
    processing means implemented in the low power microcontroller, wherein the processing means is configured to compare the sensed actuation of the valve against at least one recommended opening or closing event of the valve in real-time or near real-time; and
    means for outputting at least one operator feedback signal based on the comparison.

2. An apparatus as claimed in claim 1, wherein the valve is a powder transfer valve.

3. An apparatus as claimed in claim 1, wherein the valve is selected from the group consisting of split butterfly valve, split sliding gate valve, split ball valve, twin valve, rapid transfer port and alpha beta port.

4. An apparatus as claimed in claim 1, wherein operator actuation of the valve is selected from the group consisting of manually operable actuation, pneumatic actuation and electrical actuation.

5. An apparatus as claimed in claim 1, wherein the other end of the elongate shaft being dimensioned to form a knob.

6. An apparatus as claimed in claim 5, wherein the central hub defines a generally circular body into which a printed circuit board, battery and liquid crystal display which is visible through the second face is contained.

7. An apparatus as claimed in claim 5, wherein the central hub defines a sealed, ingress protected enclosure.

8. An apparatus as claimed in claim 1, wherein the data storage means, sensing means and processing means are located on the printed circuit board.

9. An apparatus as claimed in claim 1, wherein the processing means receives a wake-up signal from user input buttons and/or from the sensing means for sensing operator actuation of the valve or coupling and/or from one or more sensors embedded on or remote to the printed circuit board.

10. An apparatus as claimed in claim 8, wherein the processing means receives a wake-up signal from input stimuli including rotation, pulse, shock, impact and/or vibration detected by the sensing means for sensing operator actuation of the valve or coupling.

11. An apparatus as claimed in claim 1, wherein at least one operator feedback signal is selected from the group consisting of audio-visual, alphanumeric and haptic feedback.

12. An apparatus as claimed in claim 1, wherein at least one operator feedback signal is an alarm signal.

13. An apparatus as claimed in claim 1, wherein at least one operator feedback signal is displayed on a colour display means.

14. An apparatus as claimed in claim 1, wherein at least one operator feedback signal displays the angle the valve closure member makes relative to a valve housing or a percentage representative of the position of the valve closure member between fully open and fully closed.

15. An apparatus as claimed in claim 1, wherein at least one recommended opening or closing event of the valve defines opening or closing the valve closure member over a predetermined timescale, and/or closing the valve closure member to a predetermined first position then opening the valve closure member to at least a second position before fully closing the valve closure member, and/or opening the valve closure member to a predetermined first position then closing the valve closure member to at least a second position before fully opening the valve closure member.

16. An apparatus as claimed in claim 1, wherein at least one recommended opening or closing event of the valve defines moving the valve closure member to a predetermined maintenance, cleaning or sterilisation position or sequence.

17. An apparatus as claimed in claim 1, wherein at least one recommended closing event of the valve defines an over-rotation of the valve closure member beyond 90° with respect to the plane of the valve housing.

18. An apparatus as claimed in claim 1, wherein the at least one recommended opening or closing event of the valve, the sensed operator actuation of the valve or coupling and/or at least one operator feedback signal is recorded displayed for local or remote access.

19. An apparatus as claimed in claim 1, wherein the at least one recommended opening or closing event of the valve, the sensed operator actuation of the valve or coupling and/or at least one operator feedback signal is transmitted back to a remote server using a wired or wireless communications unit.

20. An apparatus as claimed in claim 1, wherein the processing means includes a GPS location module which records the location of the valve.

21. An apparatus as claimed in claim 1, wherein the processing means includes a unique product identifier.

* * * * *